United States Patent Office 3,392,171
Patented July 9, 1968

3,392,171
4-MORPHOLINO-4'-HYDROXY
BICYCLOHEXYLS
Gunther S. Fonken, Galesburg, Milton E. Herr, Barry Township, Barry County, and Herbert C. Murray, Kalamazoo, Mich., assignors to The Upjohn Company, Kalamazoo, Mich., a corporation of Delaware
No Drawing. Original application Mar. 20, 1964, Ser. No. 353,619. Divided and this application Dec. 16, 1966, Ser. No. 602,164
2 Claims. (Cl. 260—247.7)

ABSTRACT OF THE DISCLOSURE

Process for introducing a hydroxy, or keto group into the unsubstituted ring of a substituted bicyclohexyl consisting of subjecting the bicyclohexyl to the oxygenating activity of specified microorganisms.

This application is a division of application Ser. No. 353,619, filed Mar. 20, 1964, now abandoned.

This invention relates to a novel method for the introduction of oxygen into substituted bicyclohexyls and to certain products produced by the process of this invention.

More particularly, this invention relates to a process for the introduction of oxygen into the unsubstituted ring of substituted bicyclohexyls by subjecting said substituted bicyclohexyl to the oxygenating activity of a species of microorganism of Subphylum 2 of Phylum III, hereinafter identified, and to certain products thus produced.

The process and products of this invention are represented by the following reaction scheme:

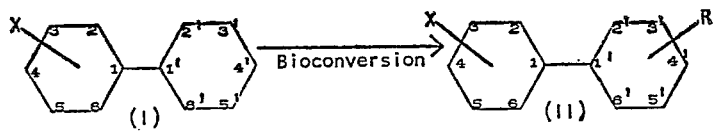

wherein R is selected from the group consisting of hydroxy and keto, and the hydroxy substituent can be attached at any position on the ring and the keto substituent can be attached at any position on the ring except the 1'-position; and X is selected from the group consisting of hydroxy, keto, cyclic lower-alkylene ketal, heterocyclic amino, oximino, hydrazono, lower-alkyl-hydrazono, phenylhydrazono, semicarbazono and thiosemicarbazono, the monovalent substituents of the aforesaid group being attached at any position on the ring and the divalent substituents of the aforesaid group being attached at any position except the 1-position.

The term "cyclic lower-alkylene ketal" means a substituent of the formula

wherein Z is a lower alkylene radical preferably containing from 2 to 8 carbon atoms, inclusive, and the attaching oxygen to carbon bonds are separated by a chain of at least 2 and not more than 3 carbon atoms, e.g., ethylene, propylene, trimethylene, 2,2-dimethyltrimethylene, 1,2-butylene, 2,4-pentylene, 4-methyl-1,2-pentylene, 1,3-hexylene, 3,4-heptylene, 1,2-octylene and the like. The term "heterocyclic amino" means a radical of the formula

representing saturated heterocyclic amino selected from the group consisting of unsubstituted and mono- and polyalkyl substituted piperidino, morpholino, thiamorpholino, pyrrolidino, hexamethylenimino, heptamethylenimino, octamethylenimino, and homomorpholino wherein each alkyl is of from 1 to 4 carbon atoms, inclusive, e.g., piperidino, morpholino, thiamorpholino, pyrrolidino, hexamethylenimino, heptamethylenimino, octamethylenimino, homomorpholino, 2-methylhexamethylenimino, 2,2-dibutylhexamethylenimino, 3,6-dimethylhexamethylenimino, 2-ethylmorpholino, 2-ethyl-5-methylmorpholino, 3,3-dimethylmorpholino, 3-methylthiamorpholino, 2,3,5,6-tetramethylthiamorpholino, 2,3,6 - trimethylthiamorpholino, 2-methylpiperidino, 3-methylpiperidino, 4-methylpiperidino, 2-butylpiperidino, 2-propylpiperidino, 4-isopropylpiperidino, 3,4-diethylpiperidino, 2-sec-butylpyrrolidino, 2,2-dimethylpyrrolidino, 2-ethylpyrrolidino, 3,4-dimethylpyrrolidino, and 2-isopropylpyrrolidino. The term "lower-alkylhydrazono" means a radical of the formula

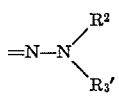

wherein $R^2$ is selected from the group consisting of hydrogen and a lower alkyl radical, containing from 1 to 6 carbon atoms, inclusive, e.g., methyl, ethyl, propyl, isopropyl, butyl, isobutyl, t-butyl, pentyl, neopentyl, hexyl, isohexyl and the like, and $R^3$ is a lower-alkyl radical as defined above.

The compounds of Formula II are useful as insecticides, fungicides, protein denaturants, insect repellants, high boiling solvents, plasticizers for synthetic resins, crosslinking agents, pharmacologic agents for psychic control effects and as intermediates for dyes, urethane polymers and fibers. For example, the dihydroxybicyclohexyls and diketobicyclohexyls of Formula II can be oxidized in accordance with methods known in the art to give the corresponding acids which are useful for making polyesters or polyamides as disclosed in German Patents 849,242 and 602,837, and the diketobicyclohexyls are useful for the preparation of octabasic acids and dilactams as disclosed in U.S. Patent 2,496,960. The dihydroxybicyclohexyls are also useful for the preparation of urethane polymers by reacting the selected dihydroxybicyclohexyl with a polyisocyanate, for example, in the manner disclosed in U.S. Patent 3,061,559, to give substantially non-porous, dense, solid materials useful as coatings, castings, moldings and laminates, or useful low-density, cellular products ranging from rigid foams to flexible, spongy materials.

The compound 4'-hydroxy - 4 - oxobicyclohexyl (II; X=4-keto; R=4-hydroxy) obtained by the process of the invention or by regeneration by known methods of the keto group from the corresponding compound II wherein X is functionally converted keto such as oximino, semicarbazono, phenylhydrazono, alkylene ketal and the like, is useful as an intermediate in the synthesis of analogs of steroidal hormones lacking Ring C [Wilds et al., J.A.C.S. 76, 1733 (1954)].

The process of this invention comprises subjecting a substituted bicyclohexyl (I) to the oxygenating activity of a species of microorganism of Subphylum 2 of Phylum III to produce the corresponding oxygenated compounds of Formula II.

The microorganisms employed in the process of this invention are those which are classified under the heading Subphylum 2 of Phylum III, which latter is commonly called Thallophyta. This system of classification is that commonly employed in the art and is set forth by Frobisher; Fundamentals of Microbiology Sixth Edition, 1957, Saunders Company, Philadelphia at page 10. This aforesaid Subphylum 2 of Phylum III embraces five classes, namely, Phycomycetes, Ascomycetes, Basidiomycetes, Deuteromycetes (Fungi imperfecti) and Schizomycetes. Table I below sets forth representative genera and orders falling within these classes of microorganisms. While all species of microorganisms falling within the five classes of Subphylum 2 can be employed in the process of this invention, it is preferred to employ species of microorganism falling within the orders: Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseulomonadales and Actinomycetales. Among the families of the above listed orders, it is preferred to employ in the practice of this invention species of microorganisms falling within the families Mucoraceae, Cunninghamellaceae, Eurotiaceae, Hysteriaceae, Nectreaceae, Clavicipitaceae, Melanconiaceae, Moniliaceae, Dematiaceae, Tuberculariaceae, Pseudomonadaceae, Mycobacteriaceae, Actinomycetaceae, and Streptomycetaceae. Of the genera within the above listed families it is preferred to employ species of microorganisms of the genera: Absidia, Circinella, Gongronella, Rhizopus, Cunninghamella, Eurotium, Gloniopsis, Glonium, Hysterium, Mytilidion, Calonectria, Gibberella, Hypomyces, Dermatea, Cenangium, Adelopus, Chaetomium, Endothia, Guignardia, Boletus, Alnicola, Deconia, Corticium, Cyathus, Ascochyta, Diplodia, Wojnowicia, Septomyxa, Aspergillus, Keratinomyces, Penicillium, Sporotrichum, Trichothecium, Brachysporium, Cladosporium, Curvularia, Cylindrocarpon, Rhizoctonia, Pseudomonas, Mycobacterium, Micrococcus, Nocardia and Streptomyces.

Development Branch, U.S. Department of Agriculture, Peoria, Ill. (NRRL), the American Type Culture Collection (ATCC), Washington, D.C., and Centraalbureau voor Schimmelcultures (CBS), Baarn, Holland, or as otherwise indicated. The species listed in Table II, together with Culture Collection numbers, are typical of those which are available from the above sources and are representative of those which can be employed in the process of the invention.

TABLE II

Phycomycetes

*Achlya americana*, ATCC 10977
*Achlya bisexualis*, ATCC 11397
*Achlya crenulata*, ATCC 11315, CBS
*Absidia cylindrospora*, ATCC 11516
*Absidia cylindrospora*, NRRL 2796
*Absidia cylindrospora*, var. rhizamorpha, NRRL 2815
*Absidia pseudocylindrospora*, NRRL 2770
*Absidia glauca*, ATCC 7852a, 7852b
*Circinella angarensis*, NRRL 2410
*Circinella angarensis*, NRRL 2628
*Circinella spinosa*, ATCC 9025, CBS
*Cunninghamella blakesleeana*, ATCC 8688a
*Cunninghamella baineri*, ATCC 6794b
*Gongronella butleri*, CBS
*Gongronella urceolifera*, CBS
*Gongronella lacrispora*, NRRL 2643
*Mucor griseocyanus*, ATCC 1207a
*Rhizopus arrhizus*, ATCC 11145
*Rhizopus nigricans*, ATCC 6227b

TABLE I

Phycomycetes;
| Order | Genera |
|---|---|
| Entomorphthorales | Conidiobolus, Delacroixia. |
| Mucorales | Absidia, Blakeslea, Circinella, Chaetocladium, Cunninghamella, Helicostylum, Gongronella, Mucor, Parasitella, Phycomyces, Rhizopus. |
| Saprolegniales | Achyla. |

Ascomycetes;
| Order | Genera |
|---|---|
| Endomycetales | Ascocybe, Byssochlamys, Cephaloascus, Endomyces, Endomycopsis, Petasospora. |
| Eurotiales | Ctenomyces, Carpenteles, Eidamella, Emericillopsis, Eurotium, Microascus, Penicilliopsis, Talaromyces. |
| Dothideales | Acrospermum, Capnodium, Chaetothyrum, Cymadothea, Dangeardiella, Dothidea, Rhopographus, Scorias. |
| Helotiales | Allophylaria, Cenangium, Corynella, Dermea, Godronia, Pezizella. |
| Hemisphaeriales | Schizothyrina, Schizothyrium. |
| Hypocreales | Balonectria, Calostilbe, Claviceps, Cordyceps, Creonectria, Epichloe, Gibberella, Hypocrea, Hypomyces, Loramyces, Melanospora, Nectria, Nectriella, Neocosmospora, Ophionectria, Sphaerostilbe. |
| Hysteriales | Farlowiella, Gloniella, Gloniopsis, Glonium Hysterium, Lophium, Mytilidion, Ostreion. |
| Myriangiales | Dothiora, Elsinoe. |
| Pezizales | Ascobolus, Discomycetella, Morchella, Patella, Pyronema, Sowerbyella, Wolfina. |
| Phacidiales | Coccopeziza, Colpoma, Clithris, Phacidiella, Phadidium, Sphaerothyrium. |
| Sphaeriales | Adelopus, Chaetomium, Chaetomidium, Clathrospora, Didymella, Endothia, Glomerella, Guignardia, Mycosphaerella Physalospora, Xylaria, Subbaromyces. |
| Taphrinales | Protomyces, Taphridium Taphrina. |

Basidiomycetes;
| Order | Genera |
|---|---|
| Agaricales | Aleurodiscus, Alnicola, Boletus, Blavaria, Coprinus, Clitocybe, Collybia, Coniophora, Corticum, Deconica, Entaloma, Fomes, Hygrophorus, Lentinellus, Lentinus, Panaeolus, Paxillus, Peniophora, Pholiota, Pleurotus, Plicatura, Polyporus, Poria, Psalliota, Schizophyllum, Sparassis, Stereum, Tricholoma, Trametes. |
| Lycoperdales | Bovista, Calvatia, Geastrum, Lycoperdon. |
| Nidulariales | Crucibulum, Byathus, Nidula, Sphaerobolus. |
| Phallles | Mutnus Phallus, Simblum. |
| Sclerodermatales | Gastrosporium, Lycogalopsis, Phellorinia, Sphaerobolus, Tulostoma. |
| Tremellales | Auricularia, Ceratobasidium, Calocera, Dacrymyces, Helicobasidium. |
| Ustilaginales | Bryophytomyces, Cintractia, Entyloma, Farysia, Graphiola, Schizonella, Sorosporium, Tilletia, Tolyposporium, Urocystis, Ustilago. |

Deuteromycetes;
| Order | Genera |
|---|---|
| Melanconiales | Actinonema, Allelchaeta, Colletotrichum, Cryptosporium, Entomosporium, Melanconium, Myxosporium, Pestalotia, Septomyxa, Steganosporium, Tuberculariella. |
| Moniliales | Acremonium, Aspergillus, Botrytis, Brachysporium, Cladosporium, Curvularia, Cylindrium, Cylindrocarpon, Dactylium, Fusarium, Gliocladium, Helicodendron, Helicosporium, Helminthosporium, Keratinomyces, Penicillium, Sepedonium, Sporotrichum, Trichothecium. |
| Mycelia Sterilia | Microxyphium, Papulospora, Rhizoctonia, Sclerotium. |
| Sphaeropsidales | Ascochyta, Coniothyrium, Dendrophoma, Diplodia, Diplodina, Polyopeus, Sphaeropsis, Wojnowicia, Zythia. |

Schizomycetes;
| Order | Genera |
|---|---|
| Actinomycetales | Micrococcus, Mycobacterium, Mycococcus, Nocardia, Streptomyces. |
| Pseudomonadales | Pseudomonas, Mycoplana, Protaminobacter. |
| Eubacteriales | Aerobacter, Arthrobacter, Bacillus, Corynebacterium. |

Cultures of a large number of species, falling within the group of microorganisms which can be employed in the process of the invention, are available from known sources such as the Northern Utilization Research and TABLE II—Continued Ascomycetes

*Adelopus nudus*, CBS
*Cenangium abietis*, CBS

TABLE II—Continued
Ascomycetes

*Dermea balsama*, CBS
*Dermea libocedri*, CBS
*Eurotium echinulatum*, CBS
*Calonectria decora*, CBS
*Clithris quercina*, CBS
*Gibberella saubinettii*, CBS
*Hypomyces haematococcus*, CBS
*Chaetomium globosum*, ATCC 6205
*Gloniopsis brevisaccata*, CBS
*Glonium clavisporum*, CBS
*Glonium stellatum*, CBS
*Hysterium angustatum*, CBS
*Hysterium insidens*, CBS
*Mytilidion australe*, CBS
*Mytilidion hastenii*, CBS
*Mytilidion tortile*, CBS
*Endothia parasitica*, ATCC 9414
*Guignardia bidwelli*, ATCC 9559, 9560

Basidiomycetes

*Alnicola escharoides*, CBS
*Boletus luteus*, CBS
*Boletus sp.*, Peck 168 (Ohio State Univ.)
*Coprinus narcoticus*, CBS
*Corticium sasakkii*, NRRL 2705
*Corticium microsclerotia*, NRRL 2727
*Clavaria stricta*, CBS
*Deconica atrorufa*, CBS
*Deconica coprophila*, CBS
*Cyathus poeppigii*, CBS
*Cyathus olla*, CBS
*Pleurotus passeckerianus*, ATCC 9416
*Pholiota adiposa*, ATCC 9393
*Poria ambigua*, ATCC 9408
*Sphaerobolus stellatus*, CBS

Deuteromycetes

*Alternaria tenuis*, ATCC 6663
*Aspergillus nidulans*, ATCC 11267
*Aspergillus niger*, ATCC 9027
*Aspergillus niger*, ATCC 9142
*Aspergillus niger*, ATCC 10579
*Aspergillus niger*, ATCC 8740
*Aspergillus proliferans*, CBS
*Aspergillus ruber*, ATCC 9481
*Aspergillus versicolor*, ATCC 9577
*Brachysporium oryzae*, ATCC 11571, CBS
*Cladosporium resinae*, NRRL 2778
*Curvularia lunata*, ATCC 12017
*Curvularia pallescens*, ATCC 12017, NRRL 2381
*Cylindrium suaveolens*, CBS
*Cylindrocarpon didymum*, CBS
*Cylindrocarpon radicicola*, ATCC 11811
*Fusarium culmorum*, ATCC 12656
*Helicodendron tubulosum*, CBS, ATCC 7898
*Helicosporium lumbricopsis*, CBS
*Helicosporium phragmitis*, CBS
*Helminthosporium carbonum*, ATCC 9627
*Keratinomyces ajelloi*, CBS
*Penicillium atrovenetum*, CBS
*Penicillium aurantio-virens*, ATCC 10413, NRRL 2138
*Penicillium patulum*, ATCC 9260, 10120, NRRL 994
*Rhizoctonia solani*, ATCC 6221, 10154, 10157, 10159, 10163
*Spedonium ampullosporum*, CBS
*Sporotrichum sulfurescens*, ATCC 7159
*Trichothecium roseum*, ATCC 8685, NRRL 1665
*Ascochyta linicola*, NRRL 2923, CBS
*Diplodia natalensis*, ATCC 9055
*Septomyxa affinis*, ATCC 6737
*Wojnowicia graminis*, CBS
*Zythia resinae*, CBS

TABLE II—Continued
Schizomycetes

*Mycobacterium rhodochrous*, ATCC 999, 4273 4276
*Micrococcus flavoroseus*, ATCC 397
*Micrococcus cerolyticus*, ATCC 12559
*Micrococcus cinnabareus*, ATCC 11890
*Micrococcus rubens*, ATCC 186
*Nocardia corallina*, CBS, ATCC 4273, 2161
*Nocardia erythropolis*, CBS, ATCC 4277
*Nocardia gardneri*, ATCC 9604
*Nocardia restrictus*, CBS
*Aerobacter aerogenes*, ATCC 8724
*Streptomyces roseochromogenus*, ATCC 3347
*Streptomyces argenteolus*, ATCC 11009
*Streptomyces olivaceus*, ATCC 12019
*Streptomyces mediocidicus*, ATCC 13279
*Streptomyces mediocidicus*, ATCC 13278
*Pseudomonas aeruginosa*, ATCC 8689
*Pseudomonas fluorescens*, ATCC 949
*Corynebacterium simplex*, ATCC 6946

In the microbiological oxygenation of the compounds of Formula I, oxygenation is effected on any position of the unsubstituted ring to give a mixture of the corresponding products (II) oxygenated at various positions on the ring. The hydroxy compounds of Formula II can be oxidized chemically to produce ketones, except when the hydroxy group is at the 1- or 1'-position. The keto groups can be reduced by known methods, e.g., catalytic hydrogenation or with a reducing agent, to the corresponding hydroxy compounds, and the hydroxy groups can be acylated, if desired, in accordance with known methods to give the corresponding monoacyloxy- and diacyloxy compounds.

The starting compounds (I) for the process of this invention wherein X is 1-, 2- and 4-hydroxy and 2- and 4-keto are known in the art. The 3-hydroxy and 3-keto compounds, the cyclic alkylene ketals, the oximes and the heterocyclic amines are prepared in accordance with Preparations 1–6 herein.

Other starting compounds are prepared in accordance with known methods (see the textbook Identification of Organic Compounds, Shriner and Fuson, Chapter VIII, John Wiley and Sons, Inc., New York, New York). Thus the bicyclohexyl hydrazones, lower-alkylhydrazones, phenylhydrazones, semicarbazones, thiosemicarbazones and the like are prepared by reacting the selected cyclohexylcyclohexanone with: hydrazine, a lower-alkyl hydrazine, e.g., methylhydrazine, N,N - dimethylhydrazine, ethylhydrazine, N,N-diethylhydrazine, N-ethyl-N-methylhydrazine, isopropylhydrazine, isobutylhydrazine, phenylhydrazine, semicarbazide, thiosemicarbazide and the like.

The operational conditions and reaction procedures of this invention are advantageously those known in the art of bioconversion as illustrated in Murray et al., U.S. Patents 2,602,769 and 2,735,800.

In the practice of this invention, the bioconversion can be effected by a growing or resting culture of the microorganism or by spores, washed cells or enzymes of the microorganism.

Culture of the selected species of microorganism for the purpose and practice of this invention is in or on a medium favorable to development of the microorganism. Sources of nitrogen and carbon should be present in the culture medium and an adequate sterile air supply should be maintained during the conversion, for example, by the conventional techniques of exposing a large surface of the medium or by passing air through a submerged culture.

Nitrogen in assimilable form can be provided by sources normally employed in such processes, such as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available carbon can also be provided by sources normally used in bioconversions such as carbohydrates, e.g., glucose, fructose, sucrose, lactose, maltose, dextrines and starches, meat extracts, peptones, amino acids, proteins, fatty acids, glycerol, whey, and the like. These materials may be used either in a purified state or as concentrates such as whey concentrate, corn steep liquor, grain mashes, and the like, or as mixtures of the above. Many of the above sources of carbon can also serve as a source of nitrogen.

The medium can desirably have a pH before inoculation of between about 4 to about 7 though a higher or lower pH can be used. A temperature between about 25 to 32° C. is preferred for growth of the microorganism but higher or lower temperatures within a relatively wide range are suitable.

The substrate can be added to the culture during the growth period of the microorganism as a single feed or by gradual addition during the conversion period, or it can be added to the medium before or after sterilization or inoculation, making appropriate adjustments for effects or pH and/or temperature upon the stability of the substrate used. The preferred, but not limiting, range of concentration of the substrate in the culture medium is about 0.1 to 10 grams per liter. The substrate is added to the medium in any suitable manner, especially one which promotes a large surface contact of the substrate to the oxidizing activity of the microorganism, for example, by dissolving the substrate when it is a solid, in an organic solvent and mixing the solution thoroughly with the medium or by adding to the medium finely comminuted particles of the substrate, e.g., micronized particles, preferably 90% by weight smaller than 20 microns, either as a dry powder or, preferably for mechanical reasons, as an aqueous suspension. In preparing the aqueous suspension, the use of dispersing or suspending agents is advantageous.

The temperature during the fermentation can be the same as that found suitable for growth of the microorganism. It need be maintained only within such a range as supports life, active growth or the enzyme activity of the microoragnism; the range of 20 to 35° C. is preferred. A pH of about 4 to 6 is generally preferred for growth of the microorganism during the bioconversion but for acid-sensitive substrates, and for microorganisms of the class Schizomycetes, the pH should be about 7 during the fermentation. Aeration can be effected by surface culture or preferably under submerged fermentation conditions, in accordance with methods well known in the art. The time required for oxygenation by the enzymatic system of the microorganism employed can vary considerably. The range of about 2 to 120 hours is practical but not limiting; 72 hours is generally satisfactory. The progress of the bioconversion and its completion are conveniently determined by paper-strip chromatography, vapor-phase chromatography or thin-film chromatography [Heftman, Chromatography (1961), Reinhold Publishing Co., New York, N.Y.].

Alternatively, the oxygenation of the selected substrate can be effected under aerobic conditions by subjecting the substrate to the oxygenating action of oxygenating enzymes isolated from the microorganism, to the action of spores of the microoragnism, and to the action of isolated cells of the microorganism. Isolated enzyme preparations can be prepared in accordance with the general procedure disclosed by Zuidweg et al., Biochim. Biophys. Acta, 58, 131–133 (1962). Oxygenation can be effected with spores in accordance with the general process disclosed in U.S. Patents 3,031,379 and 3,031,382. The separation of washed cells from the fermentation medium is well known in the art, see for example U.S. Patent 2,831,789.

The term "oxygenating activity" as used throughout this specification means the enzymatic action of a growing or resting culture of the microorganism or of spores, washed cells or isolated enzymes of the microorgnaism, which effects introduction of oxygen in the molecule of the substrate, under aerobic fermentation conditions.

After completion of the fermentation, the resulting oxygenated products are recovered from the fermentation beer by conventional methods. For example, the whole beer can be extracted with a water-immiscible, organic solvent such as methylene chloride, chloroform, carbon tetrachloride, ethylene chloride, trichloroethylene, ether, amyl acetate, benzene, and the like, or the beer and mycelia can be separated by conventional methods such as centrifugation or filtration, and then separately extracted with suitable solvents. The mycelia can be extracted with either water-miscible or water-immiscible solvents, or the mycelia can be merely washed with water in cases where little or no product is contained in the mycelium, and the wash water added to the beer filtrate. The beer, free of mycelia, can then be extracted with water-immiscible solvents such as those listed above. The extracts are combined, dried over a drying agent, e.g., anhydrous sodium sulfate, and the solvent removed by conventional methods, e.g., evaporation or distillation at atmospheric or reduced pressure. The oxygenated products thus obtained can be further purified by conventional methods, e.g., recrystallization, chromatography, distillation in the case of liquids, and the like.

Separation of the products (II) biologically oxygenated at various positions on the ring is accomplished by conventional methods, e.g., chromatography and/or fractional crystallization. In certain instances where separation of the hydroxy compounds is difficult, a convenient and advantageous method is first to oxidize under acidic, neutral or slightly basic conditions the crude oxygenated products (II) in accordance with methods known in the art for oxidizing secondary hydroxy groups to ketones, for example, Fieser and Fieser, Natural Products Related to Phenanthrene, 3rd ed., pages 127–129, 193 and 194, Reinhold Publishing Corp., New York, N.Y. Thus, the crude mixture containing the oxygenated bicyclohexyls can be dissolved in an inert organic solvent, such as acetone, benzene, methylene chloride, t-butanol, and the like, and then oxidized with aqueous chromic acid, potassium permanganate, t-butylhypochlorite or like oxidizing agents to produce the corresponding keto compounds which can then be more easily separated by chromatography or crystallization or both.

The ketal compounds of Formula II, wherein X is

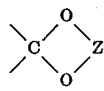

and Z has the same meaning as previously given, can be hydrolyzed by known methods for hydrolyzing cyclic ketal groups, e.g., with a dilute mineral acid as disclosed in U.S. Patent 2,707,184, to the corresponding keto compounds. Likewise, when the ketal group is present, the above described oxidation procedures which are carried out under acidic conditions will normally convert the ketal to a keto group.

The following preparations and examples are intended to illustrate the process of this invention as applied to representative and typical individual organisms. The examples are for the purpose of illustrating the best mode contemplated of carrying out the invention and to supplement the foregoing disclosure of the invention with additional description of the manner and process of carrying out the invention so as to further enable workers skilled in the art to do so.

PREPARATION 1

*3-hydroxybicyclohexyl*

A solution of 19.42 of 3-phenylcyclohex-2-enone in 200 ml. of 95% ethanol containing 2 ml. of concentrated hydrochloric acid was hydrogenated at 40 p.s.i. (gauge) initial pressure over 5.65 g. of Adam's platinum catalyst. The mixture was filtered, the filtrate was evaporated and the residue was purified by chromatography and distillation at 112.5–115°/0.2 mm. to give 4.86 g. of 3-hydroxybicyclohexyl.

Analysis.—Calcd. for $C_{12}H_{22}O$: C, 79.06; H, 12.16. Found: C, 78.95; H, 11.80.

PREPARATION 2

*4-oxobicyclohexyl cyclic ethylene ketal*

Oxidation at 25–30° C. of 100 g. of 4-hydroxybicyclohexyl in about 1 l. of acetone with chromic acid gave 91.5 g. of crude 4-oxobicyclohexyl as a pale yellow oil. The crude ketone was converted to the cyclic ethylene ketal by stirring and refluxing for about three hours with a mixture of 200 ml. of ethylene glycol, 3.2 g. of p-toluenesulfonic acid monohydrate, and about 2 l. of benzene in an apparatus equipped with a water trap; the 4-oxobicyclohexyl cyclic ethylene ketal thus produced was recrystallized from methanol; yield 68.9 g., M.P. 47–49° C.

Analysis.—Calcd. for $C_{14}H_{24}O_2$: C, 74.95; H, 10.78. Found: C, 75.16; H, 10.61.

In the same manner, 3-hydroxybicyclohexyl and 2-hydroxybicyclohexyl are oxidized to 3-oxobicyclohexyl and 2-oxobicyclohexyl, respectively, and converted to 3-oxobicyclohexyl cyclic ethylene ketal and 2-oxobicyclohexyl cyclic ethylene ketal, respectively.

PREPARATION 3

*4-oxobicyclohexyl cyclic trimethylene ketal*

Crude 4-oxobicyclohexyl (25 g.) was converted to the cyclic trimethylene ketal by stirring and refluxing for about 48 hours with 20 ml. of propane-1,3-diol and 1 g. of p-toluenesulfonic acid monohydrate in 200 ml. of benzene in an apparatus equipped with a water trap. The ketal was isolated as an oil that crystallized. Recrystallization from ether afforded 4.13 g. of 4-oxobicyclohexyl cyclic trimethylene ketal, M.P. 50–54.5° C.; a sample recrystallized twice from methanol melted at 58.5–59° C.

Analysis.—Calcd. for $C_{15}H_{26}O_2$: C, 75.58; H, 11.00. Found: C, 75.83; H, 10.77.

In the same manner, substituting 3-oxobicyclohexyl or 2-oxobicyclohexyl for 4-oxobicyclohexyl is productive of the respective cyclic trimethylene ketals.

In the same manner, substitution of ethylene glycol or propane-1,3-diol in Preparations 1 and 2 by other glycols such as propane-1,2-diol, butane-2,3-diol, pentane-2,4-diol, 4-methylpentane-1,2-diol, hexane-1,3-diol, heptane-1,2-diol, heptane-3,4-diol and octane-1,3-diol is productive of other compounds of Formula I, wherein X is a cyclic alkylene ketal substituent.

PREPARATION 4

*4-oxobicyclohexyl oxime*

The crude 4-oxobicyclohexyl obtained by the chromic acid oxidation of 25 g. of 4-hydroxybicyclohexyl was dissolved in a mixture of 125 ml. each of ethanol and pyridine, and refluxed for two hours with 25 g. of hydroxylamine hydrochloride. Evaporation of the solvent, and recrystallization of the residue from aqueous methanol gave 21.7 g. of 4-oxobicyclohexyl oxime, M.P. 100–107°.

In the same manner, substitution of 3-hydroxybicyclohexyl or 2-hydroxybicyclohexyl for 4-hydroxybicyclohexyl results in the preparation of 3-oxobicyclohexyl oxime and 2-oxobicyclohexyl oxime, respectively.

PREPARATION 5

*4-piperidinobicyclohexyl and the hydrochloride thereof*

Piperidine (49.5 ml.) was added slowly to 19.9 ml. of 98+% formic acid with stirring and external cooling; 45 g. of 4-oxobicyclohexyl was added and the mixture was refluxed for 5 hours and then allowed to stand at room temperature for about 12 hours. The precipitate which separated was recovered by filtration, washed with water and dissolved in acetone. The solution was concentrated until the product started to precipitate from solution; the mixture was then chilled and 4-piperidinobicyclohexyl was recovered by filtration, washed with cold acetone, and air dried; yield 20 g., M.P. 145–146° C.

Analysis.—Calcd. for $C_{17}H_{31}N$: C, 81.85; H, 12.53; N, 5.62. Found: C, 81.84; H, 12.42; N, 5.88.

The acetone mother liquors were evaporated to dryness, and the residue was combined with the filtrate and aqueous wash from the first filtration above and acidified with about 50 ml. of concentrated hydrochloric acid. The acidified mixture was extracted several times with ether, boiled to remove dissolved ether, heated under reflux for about 5 hours, and allowed to stand at room temperature for about 14 hours. The 4-piperidinobicyclohexyl hydrochloride which separated was recovered by filtration, washed with cold water and ether, and dried; yield, 20.56 g., M.P. 278–280° C.

Analysis.—Calcd. for $C_{17}H_{31}N \cdot HCl$: C, 71.41; H, 11.28; Cl, 12.40. Found: C, 71.35; H, 11.21; Cl, 12.47.

In the same manner substitution of 3-oxobicyclohexyl or 2-oxobicyclohexyl for the 4-isomer is productive of 3-piperidinobicyclohexyl and 2-piperidinobicyclohexyl, respectively, and their hydrochlorides.

PREPARATION 6

*4-morpholinobicyclohexyl and the hydrochloride thereof*

Following the procedure described in Preparation 5, 29.0 ml. of morpholine, 12.5 ml. of formic acid and 30.0 g. of 4-oxobicyclohexyl were heated under reflux for 5 hours and allowed to stand at room temperature for about 12 hours. The crystals which separated were recovered, washed with water, and recrystallized from acetone; yield, 9.50 g. of 4-morpholinobicyclohexyl, M.P. 133° C.

Analysis.—Calcd. for $C_{16}H_{29}NO$: C, 76.44; H, 11.63; N, 5.57. Found: C, 76.55; H, 11.63; N, 5.57.

The filtrates from above were combined, treated with about 30 ml. of concentrated hydrochloric acid, and the mixture was processed as in Preparation 5 to produce 9.04 g. of 4-morpholinobicyclohexyl hydrochloride. A portion of this salt was dissolved in water, and the free base was precipitated by the addition of N sodium hydroxide. Recrystallization from aqueous acetone gave a 4-morpholinobicyclohexyl, M.P. 57° C., which was isomeric with the material melting at 133° C. isolated above.

Analysis.—Calcd. for $C_{16}H_{29}NO$: C, 76.44; H, 11.63; N, 5.57. Found: C, 75.92; H, 11.15; N, 5.58.

In the same manner, substitution of 3-oxobicyclohexyl and 2-oxobicyclohexyl for 4-oxobicyclohexyl is productive of 3-morpholinobicyclohexyl and 2-morpholinobicyclohexyl, respectively, and their hydrochlorides.

In the same manner, other heterocyclic amino bicyclohexyls and their hydrochlorides can be prepared by substituting other heterocyclic amines in place of piperidine or morpholine in Preparation 5 or 6. Such substitution is productive, for example, of 4-pyrrolidinobicyclohexyl
4-thiomorpholinobicyclohexyl
2-piperazinobicyclohexyl
4-(4-methyl-1-piperazinyl)bicyclohexyl
3-(4-propionyl-1-piperazinyl)bicyclohexyl
2-(4-butyryl-1-piperazinyl)bicyclohexyl and the like, and their hydrochloride salts.

The heterocyclic amino bicyclohexyls can be converted to other pharmacologically acceptable salts by contacting the free amine with other acids, e.g., hydrogen bromide, hydrogen iodide, sulfuric acid, phosphoric acid, citric acid, succinic acid, maleic acid, latic acid and the like.

The hydrochloride and other pharmacologically acceptable acid addition salts of the heterocyclicamino bicyclohexyls of Formula I, represented more specifically by the following structural formula:

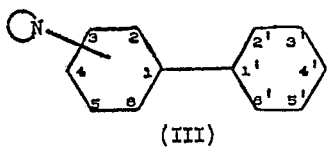

(III)

wherein the radical

has the meaning previously given, have cytotoxic activity and are useful for the inhibition of tumor cell contaminants on instruments in physicians' offices and hospitals.

The novel compounds of Formula III are also useful in accordance with U.S. Patents 1,915,334 and 2,075,359 in preparing amine fluosilicate mothproofing agents, and in accordance with U.S. Patents 2,425,320 and 2,606,155 in preparing amine thiocyanate-formaldehyde condensation products for use as pickling inhibitors.

EXAMPLE 1

*Oxygenation of 4-hydroxybicyclohexyl (I)*

4-hydroxybicyclohexyl was subjected to oxygenation by exposure to a growing culture of each of the species listed in Table III below.

Media

For species of the classes Phycomycetes, Ascomycetes, Basidiomycetes and Deuteromycetes the following medium was employed:

(A)

| | | |
|---|---|---|
| Cornsteep Liquor (60% solids) | g__ | 2 |
| Commercial dextrose | g__ | 1 |
| Tap water | ml__ | 100 |
| Lard oil adjusted to pH 4.8–5 | ml__ | 0.1 |

For species of the class Schizomycetes the following medium was employed:

(B)

| | | |
|---|---|---|
| Commercial dextrose | g__ | 0.15 |
| Yeast extract | g__ | 0.15 |
| Peptone | g__ | 0.5 |
| Sodium chloride | g__ | 0.35 |
| Dipotassium phosphate | g__ | 0.36 |
| Tap water adjusted to pH 7 | ml__ | 100 |

The appropriate medium in a 250 ml. shake flask was sterilized and inoculated with about 5 ml. of a vegetative growth of the microorganism and incubated with shaking at a temperature of about 28° C.

After 24 to 48 hours, or when a moderate to heavy growth of mycelium was apparent, a solution of 20 mg. of 4-hydroxybicyclohexyl in 0.25 ml. of N,N-dimethylformamide was added and the incubation was continued for an additional 72-hour period. Oxygenated product was separated from the fermentation beer by extracting the whole beer 4 times with a volume of methylene chloride equal to one-fourth the volume of the whole beer. The combined extracts were washed with one-fourth volume of distilled water and the solvent was removed by distillation. The residue thus obtained was assayed by paper strip chromatography and found to consist of a mixture of isomeric dihydroxybicyclohexyls.

The paper strip chromatography was carried out using the Bush B–3 system in which the sheet was equilibrated overnight at 34° C. in the vapor from a mixed solvent composed of 667 ml. of Skellysolve C (isomeric hexanes), 333 ml. of benzene, 800 ml. of methanol and 200 ml. of water, and developed with the non-polar phase. The hydroxy ketones were detected by spraying the developed sheet with 2,4-dinitrophenylhydrazine reagent, or phosphomolybdic reagent, and the diols were detected by treating the developed sheet in phosphomolybdic reagent [L. M. Reineke, Anal. Chem., 28, 1853–58 (1952)].

The crude residue in each of the experiments was dissolved in 1 ml. of acetone and oxidized at room temperature by the addition of a visible excess of Jones reagent (2.67 M chromic acid reagent prepared from 26.7 g. of chromium trioxide and 23 ml. of sulfuric acid diluted to 100 ml. with water). The exces oxidant was destroyed by the addition of a few drops of isopropyl alcohol and the mixture was evaporated to dryness. Water (2 ml.) was added, and the products were extracted with 2 ml. of methylene chloride. The extract was evaporated to dryness and the residue was subjected to paper chromatography by the method described above and to gas-liquid (vapor phase) chromatography; the products were identified as dioxobicyclohexyls corresponding to the dihydroxybicyclohexyls and the hydroxyketones produced in the bioconversion.

The gas-liquid chromatography was carried out by injecting 0.02 ml. of 1:1 ethylene dichloride-methanol solution containing 1 mg. of sample into an injection port heated at 263° C. The column was packed with 5% of a methyl silicon polymer (General Electric SE 30) on 30–60 mesh fluorinated polymer (Haloport F). The temperature was programmed at 6.4° C./minute from 90° C. to 275° C. at a helium flow rate of 35–40 ml. per minute. The detection block temperature was 265° C.

TABLE III

*Achlya americana*, ATCC 10977
*Achlya bisexualis*, ATCC 11397
*Achlya crenulata*, ATCC 11315, CBS
*Absidia cylindrospora*, ATCC 11516
*Absidia cylindrospora*, NRRL 2796
*Absidia cylindrospora*, var. rhizamorpha, NRRL 2815
*Absidia pseudocylindrospora*, NRRL 2770
*Absidia glauca*, ATCC 7852a, 7852b
*Circinella spinosa*, ATCC 9025, CBS
*Cunninghamella blakesleeana*, ATCC 8688a
*Gongronella butleri*, CBS
*Mucor griseocyanus*, ATCC 1207a
*Rhizopus arrhizus*, ATCC 11145
*Rhizopus nigricans*, ATCC 6227b
*Calonectria decora*, CBS
*Gibberella saubinettii*, CBS
*Hypomyces haematococcus*, CBS
*Chaetomium globosum*, ATCC 6205
*Endothia parasiticus*, ATCC 9414
*Guignardia bidwellii*, ATCC 9559
*Corticium sasakii*, NRRL 2705
*Corticium microsclerotia*, NRRL 2727
*Deconica coprophila*, CBS
*Cyathus poeppigii*, CBS
*Cyathus olla*, CBS
*Sphaerobolus stellatus*, CBS
*Aspergillus nidulans*, ATCC 11267
*Aspergillus niger*, ATCC 9027
*Aspergillus niger*, ATCC 9142
*Aspergillus niger*, ATCC 10579
*Aspergillus niger*, ATCC 8740
*Aspergillus proliferans*, CBS
*Aspergillus ruber*, ATCC 9481
*Brachysporium oryzae*, ATCC 11571, CBS
*Cladosporium resinae*, NRRL 2778
*Curvularia lunata*, ATCC 12017
*Curvularia pallescens*, ATCC 12017, NRRL 2381
*Fusarium culmorum*, ATCC 12656
*Helicodendron tubulosum*, CBS
*Helicosporium lumbricopsis*, CBS
*Helicosporium phragmitis*, CBS
*Keratinomyces ajelloi*, CBS
*Penicillium atrovenetum*, CBS
*Penicillium aurantio-virens*, ATCC 10413, NRRL 2138
*Penicillium patulum*, NRRL 994
*Sepedonium ampullosporum*, CBS TABLE III—Continued

*Septomyxa affinis*, ATCC 6737
*Sporotrichum sulfurescens*, ATCC 7159
*Trichothecium roseum*, ATCC 8685
*Ascochyta linicola*, NRRL 2923
*Diplodia natalensis*, ATCC 9055
*Wojnowicia graminis*, CBS
*Mycobacterium rhodochrous*, ATCC 4273
*Micrococcus flavoroseus*, ATCC 397
*Micrococcus cerolyticus*, ATCC 12599
*Micrococcus cinnabareus*, ATCC 11890
*Micrococcus rubens*, ATCC 186
*Nocardia corallina*, ATCC 4273
*Nocardia erythropolis*, ATCC 4277
*Nocardia gardneri*, ATCC 9604
*Pseudomonas aeruginosa*, ATCC 8689
*Pseudomonas fluorescens*, ATCC 949
*Corynebacterium sp.*, ATCC 184
*Streptomyces roseochromogenus*, ATCC 3347
*Streptomyces argenteolus*, ATCC 11009
*Streptomyces olivaceus*, ATCC 12019

EXAMPLE 2

The procedure of Example 1 was repeated using 2-hydroxybicyclohexyl as the substrate, medium A and the following microorganisms:

*Achlya americana*, ATCC 10977
*Achlya crenulata*, ATCC 11315
*Helicosporium lumbricopsis*, CBS
*Helicosporium phragmitis*, CBS
*Helicodendron tubulosum*, CBS
*Aspergillus niger*, ATCC 9142
*Aspergillus niger*, ATCC 9029 to obtain a mixture of isomeric dioxygenated bicyclohexyls the major components of which were usually 2,4'-dihydroxybicyclohexyl and 2,3'-dihydroxybicyclohexyl accompanied in certain instances by other dihydroxybicyclohexyls and by the corresponding hydroxyketones. The other species listed in Table II can likewise be used for the oxygenation of 2-hydroxybicyclohexyl to give similar results.

In the same manner other compounds of Formula I, e.g., 3-hydroxybicyclohexyl, 1-hydroxybicyclohexyl, the 2-, 3- and 4-oxobicyclohexyls, the corresponding ketal and oxime derivatives thereof and the 1, 2, 3 and 4 heterocyclicamino substituted bicyclohexyls, are likewise oxygenated in accordance with the procedure of Example 1 to give mixtures of the corresponding oxygenated bicyclohexyls of Formula II.

EXAMPLE 3

*Oxygenation of 4-hydroxybicyclohexyl*

A medium was prepared of 20 g. of cornsteep liquor (60% solids), 10 g. of commercial dextrose, and 1 l. with tap water and adjusted to a pH between 4.8 and 5. One ml. of lard oil antifoam agent was added as an antifoam preventive. Ten l. of this sterilized medium was inoculated with a 72-hour vegetative growth of *Cunninghamella blakesleeana* (ATCC 8688A) and after incubation for 24 hours at a temperature of about 28° C. using a rate of aeration of 0.5 l. per minute at 300 r.p.m. a solution of 2.5 g. of 4-hydroxybicyclohexyl in 25 ml. of dimethylformamide was then added to the fermentation. After an additional 72-hour period of incubation, the beer and mycelium were separated by filtration. The mycelium was washed with water and the wash-water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue comprising a mixture of oxygenated 4-hydroxybicyclohexyls. This residue was dissolved in about 25 ml. of methylene chloride, chromatographed on Florisil and eluted with Skellysolve B containing increasing proportions of acetone. The eluate fractions containing the desired materials (determined by I.R.) were evaporated to dryness and the residues were recrystallized first from acetone-Skellysolve B and then from acetone. There were thus obtained 4-hydroxy-4'-oxobicyclohexyl, M.P. 115–122° C., and 4,4'-dihydroxybicyclohexyl, M.P. 214–219° C.

The 4-hydroxy-4'-oxobicyclohexyl was characterized by oxidation with chromic acid to 4,4'-dioxobicyclohexyl, M.P. 114–116.5° C., and by benzoylation to 4-hydroxy-4-oxobicyclohexyl benzoate, M.P. 144–149° C.

EXAMPLE 4

*Oxygenation of 4-hydroxybicyclohexyl*

The bioconversion and extraction procedures of Example 3 were repeated on a larger scale using 100 l. of sterilized medium of the same composition, the microorganism *Rhizopus arrhizus*, ATCC 11145, an aeration rate of 5 l. per minute and 25 g. of 4-hydroxybicyclohexyl as the substrate. The product obtained by solvent extraction was shown by chromatographic analysis to contain a mixture of oxygenated 4-hydroxybicyclohexyls. This product was chromatographed on Florisil and eluted as in Example 1. The appropriate fractions were combined and evaporated to give 11.3 g. of product which was processed further in a Craig countercurrent distribution apparatus using ethyl acetate:cyclohexane:methanol:water (75:25:44:56) as a solvent system. Crystallization from acetone of the main fractions thus obtained gave (A) 493.2 mg. of 4,4'-dihydroxybicyclohexyl, M.P. 175–177° C. characterized by I.R. and oxidation with chromic acid to 4,4'-dioxobicyclohexyl.

(B) 534 mg. of 4,1'-dihydroxybicyclohexyl, M.P. 160–161° C.

Calcd. for $C_{12}H_{22}O_2$: C, 72.68; H, 11.18. Found: C, 72.58; H, 11.21.

(C) 0.46 g. of 4,4'-dihydroxybicyclohexyl, M.P. 213–215° C., isomeric to (A), above. Infrared analysis confirmed the structure.

(D) 0.36 g. of 4,2'-dihydroxybicyclohexyl, M.P. 103–105° C.

EXAMPLE 5

*Oxygenation of 4-hydroxybicyclohexyl*

The bioconversion and extraction procedures of Example 3 were repeated using 10 l. of sterilized medium of the same composition, the microorganism *Sporotrichum sulfurescens*, ATCC 7159, a rate of aeration of 1 l. per minute and 2.5 g. of 4-hydroxybicyclohexyl as the substrate. The crude residue thus obtained was triturated with ether to give 1.40 g. of crystalline product which was recrystallized from acetone to give 0.86 g. of 4,4'-dihydroxybicyclohexyl, M.P. 214–216° C.

EXAMPLE 6

*Oxygenation of 4-hydroxybicyclohexyl*

A medium was prepared of 1.5 g. of beef extract, 1.5 g. of yeast extract, 5 g. of peptone, 1.0 g. of dextrose, 3.5 g. of sodium chloride, 3.58 g. of dipotassium phosphate, 1.32 g. of monopotassium phosphate, and 1 liter of tap water and adjusted to about pH 7. One ml. of lard oil was added as an antifoam preventive. Ten l. of this medium was sterilized and inoculated with a 72-hour vegetative growth of Pseudomonas species designated as PM–1 by M. H. Rogoff, U.S. Department of Interior, Bureau of Mines, Region V, Pittsburgh, Pa., and incubated for 48 hours at a temperature of about 28° C. using a rate of aeration of 0.5 l. per minute at 300 r.p.m. After 48 hours of incubation, a solution of 2.5 g. of 4-hydroxybicyclohexyl in 25 ml. of dimethylformamide was added to the fermentation. After an additional 72-hour period of incubation, the whole beer was extracted in the same manner as described in Example 3. The crude residue thus obtained was shown by chromatographic analysis to contain a mixture of oxygenated 4-hydroxybicyclohexyls (II). This residue was dissolved in about 25 ml. of methylene chloride, chromatographed on Florisil and eluted with Skellysolve B containing increasing proportions of acetone. Material eluted with 25% acetone-Skellysolve B gave a mixture of diols which were recrystallized from acetone to give as the major product 4,4'-dihydroxybicyclohexyl, identified by its infrared spectrum.

The additional isomeric oxygenated 4-hydroxybicyclohexyls contained in the mother liquors and eluates can be recovered by conventional methods.

EXAMPLE 7

*Oxygenation of 4-oxobicyclohexyl*

The procedures of Example 3 were repeated using the microorganism *Sporotrichum sulfurescens*, ATCC 7159, and 2.5 g. of 4-oxobicyclohexyl as the substrate giving 4-oxo-4'-hydroxybicyclohexyl as the major product together with lesser amounts of isomeric 4-oxo-hydroxybicyclohexyls.

EXAMPLE 8

*Oxygenation of 2-hydroxybicyclohexyl*

The bioconversion and extraction procedures of Example 3 were repeated using 100 l. of sterilized medium of the same composition, the microorganism *Sporotrichum sulfurescens*, ATCC 7159, an aeration rate of 5 l. per minute and 25 g. of 2-hydroxybicyclohexyl as the substrate to give a mixture of oxygenated 2-hydroxybicyclohexyl as the substrate to give a mixture of oxygenated 2 - hydroxybicyclohexyls. Chromatographic analysis showed 2,3'-dihydroxybicyclohexyl and 2,4'-dihydroxybicyclohexyl to be the major products.

The mixture thus obtained was subjected to liquid-liquid countercurrent distribution using a system of chloroform:methanol:water–10:3:7. Oxidation of the products thus obtained with chromic acid gives 2,3'-dioxobicyclohexyl and 2,4'-dioxobicyclohexyl.

EXAMPLE 9

*Oxygenation of 2-hydroxybicyclohexyl*

The bioconversion and extraction procedures of Example 3 were repeated using the same microorganism, *Cunninghamella blakesleeana*, and 2 g. of 2-hydroxybicyclohexyl as the substrate. The product thus obtained was assayed by papergram and found to be a mixture of oxygenated 2-hydroxybicyclohexyls, the major components of which were 2,3'-dihydroxybicyclohexyl and 2,4'-dihydroxybicyclohexyl.

EXAMPLE 10

*Oxygenation of 2-oxobicyclohexyl*

The procedures of Example 3 were repeated using the microorganism *Sporotrichum sulfurescens*, ATCC 7159, and 3 g. of 2-oxobicyclohexyl as the substrate to give a mixture of oxygenated 2-oxobicyclohexyls. Chromatographic analysis showed 2-oxo-3'-hydroxybicyclohexyl and 2-oxo-4'-hydroxybicyclohexyl to be the major products.

EXAMPLE 11

*Oxygenation of 3-hydroxybicyclohexyl*

The procedures of Example 3 were repeated using the microorganism *Sporotrichum sulfurescens*, ATCC 7159, and 2.0 g. of 3-hydroxybicyclohexyl as the substrate to give a mixture of oxygenated 3-hydroxybicyclohexyls comprised mainly of 3,3'-dihydroxybicyclohexyl and 3,4'-dihydroxybicyclohexyl.

Oxidation with chromic acid gave 0.86 g. of a mixture of the corresponding dioxobicyclohexyls containing 3,3'-dioxobicyclohexyl and 3,4'-dioxobicyclohexyl as the major products.

EXAMPLE 12

*Oxygenation of 1-hydroxybicyclohexyl*

The procedures of Example 3 were repeated using the microorganism *Sporotrichum sulfurescens*, ATCC 7159, and 2.0 g. of 1-hydroxybicyclohexyl as the substrate to give a mixture of oxygenated 1-hydroxybicyclohexyls. Chromatographic analysis showed the major product to be 1,4'-dihydroxybicyclohexyl.

EXAMPLE 13

*Oxygenation of 3-hydroxybicyclohexyl*

The procedures of Example 3 were repeated using the microorganism *Alnicola escharoides*, CBS, and 3-hydroxybicyclohexyl as the substrate to give a mixture of oxygenated 3-hydroxybicyclohexyls, the major components of which were 3,3'-dihydroxybicyclohexyl and 3,4'-dihydroxybicyclohexyl.

EXAMPLE 14

*Oxygenation of 2-oxobicyclohexyl*

The procedures of Example 3 were repeated using the microorganism *Cyathus peoppigii*, CBS, and 2-oxobicyclohexyl as the substrate to give a mixture of oxygenated 2-oxobicyclohexyls, the major components of which were 2-oxo-3'-hydroxybicyclohexyl and 2-oxo-4'-hydroxybicyclohexyl.

EXAMPLE 15

*Oxygenation of 4-oxobicyclohexyl oxime*

The bioconversion and extraction procedures of Example 3 were repeated using the microorganism *Sporotrichum sulfurescens*, ATCC 7159, and 2 g. of 4-oxobicyclohexyl oxime as the substrate. The product thus obtained was shown by chromatographic analysis to contain as the major product 4-oxo-4'-hydroxybicyclohexyl oxime together with other isomeric oxygenated 4-oxobicyclohexyl oximes. Hydrolysis of the 4-oxo-4'-hydroxybicyclohexyl oxime followed by chromic acid oxidation gave a semi-crystalline product which was recrystallized from acetone-Skellysolve B to give 0.19 g. of 4,4'-dioxobicyclohexyl, identified by its infrared spectrum.

EXAMPLE 16

*Oxygenation of 3-oxobicyclohexyl oxime*

The bioconversion and extraction procedures of Example 5 were repeated using the microorganism *Nocardia corallina*, CBS, and 3-oxobicyclohexyl oxime as the substrate to give a mixture of oxygenated 3-oxobicyclohexyl oximes comprising 3-oxo-4'-hydroxybicyclohexyl oxime as the major component.

EXAMPLE 17

*Oxygenation of 2-oxobicyclohexyl oxime*

The bioconversion and extraction procedures of Example 3 were repeated using the microorganism *Adelopus nudus*, CBS, and 2-oxobicyclohexyl oxime as the substrate to give a mixture of oxygenated 2-oxobicyclohexyl oximes, the major component of which was 2-oxo-4'-hydroxybicyclohexyl oxime.

In the same manner following the procedures of Examples 14, 15 or 16, other carbonyl groups derivatives of Formula I, i.e., the hydrazones, lower-alkylhydrazones, phenylhydrazones, semicarbazones and thiosemicarbazones, can be used as the substrate in place of the oximes to give the corresponding oxygenated products of Formula II.

EXAMPLE 18

*Oxygenation of 4-oxobicyclohexyl cyclic ethylene ketal*

The procedures of Example 3 were repeated using 10 l. of sterilized medium of the same composition, the microorganism *Sporotrichum sulfurescens*, ATCC 7159, and 2.5 g. of 4-oxobicyclohexyl cyclic ethylene ketal as the substrate. The eluate fractions containing the desired products (determined by I.R.) were combined, evaporated to dryness and triturated with acetone:Skellysolve B (1:6) to give 0.13 g. of 4-oxo-4'-hydroxybicyclohexyl cyclic ethylene ketal, M.P. 113–117° C.; a sample after two recrystallizations from acetone:Skellysolve B melted at 118.5°–119.5° C.

*Analysis.*—Calcd. for $C_{14}H_{24}O_3$: C, 69.96; H, 10.07. Found: C, 70.01; H, 9.84.

The 4-oxo-4'-hydroxybicyclohexyl oxime was hydrolyzed with dilute hydrochloric acid and the product recrystallized from acetone:Skellysolve B to give 4-oxo-4'-hydroxybicyclohexyl, M.P. 127–129° C.; the infrared spectrum corresponded to that of an authentic specimen.

Other oxygenated 4-oxobicyclohexyl oximes were present in the various eluate fractions obtained by elution of the chromatographic column.

Example 19

*Oxygenation of 4-oxobicyclohexyl cyclic trimethylene ketal*

The procedures of Example 3 were repeated using the microorganism *Sporotrichum sulfurescens*, ATCC 7159, and 2.5 g. of 4-oxobicyclohexyl cyclic trimethylene ketal as the substrate to give 0.57 g. of 4-oxo-4'-hydroxybicyclohexyl cyclic trimethylene ketal, M.P. 93–100° C. as the major component; a sample after two recrystallizations from acetone:Skellysolve B melted at 108–109° C.

*Analysis.*—Calcd. for $C_{15}H_{26}O_3$: C, 70.83; H, 10.30. Found: C, 70.81; H, 10.12.

A sample of the 4-oxo-4'-hydroxybicyclohexyl cyclic trimethylene ketal was hydrolyzed with dilute hydrochloric acid to 4-oxo-4'-hydroxybicyclohexyl which after recrystallization from acetone-Skellysolve B melted at 131.5–133° C. The infrared spectrum of the latter compound was identical to that of an authentic specimen.

In the same manner, the other cyclic alkylene ketals of Formula I, prepared in Preparations 2 and 3 above, are substituted as starting material in Examples 17 and 18, to produce the corresponding oxygenated products of Formula II. Likewise, other organisms, e.g., those listed in Table II, can be substituted for *Sporotrichum sulfurescens*. The following conversions showing the major products obtained are representative:

3-oxobicyclohexyl cyclic ethylene ketal with *Hysterium augustatum*, CBS, to 3-oxo-4'-hydroxybicyclohexyl cyclic ethylene ketal;

2-oxobicyclohexyl cyclic ethylene ketal with *Glonium stellatum*, CBS, to 2-oxo-4'-hydroxybicyclohexyl cyclic ethylene ketal;

3-oxobicyclohexyl cyclic trimethylene ketal with *Rhizoctonia solani*, ATCC 6221, to 3-oxo-4'-hydroxybicyclohexyl cyclic trimethylene ketal;

2-oxobicyclohexyl trimethylene ketal with *Mytilidion tortile*, CBS, to 2-oxo-4'-hydroxybicyclohexyl cyclic trimethylene ketal.

Example 20

*Oxygenation of 4-morpholinobicyclohexyl*

The bioconversion and extraction procedures of Example 3 were repeated using the microorganism *Sporotrichum sulfurescens*, ATCC 7159, and 2 g. of 4-morpholinobicyclohexyl as the substrate. The product thus obtained was stirred with about 100 ml. of 3 N hydrochloric acid and extracted five times with about 50 ml. volumes of ether. The aqueous acid solution was then chilled with ice and made basic by the addition of 50% sodium hydroxide solution. A precipitate separated which was recovered by filtration, washed with a little ice water and dried; yield 0.325 g. of 4-morpholino-4'-hydroxybicyclohexyl, M.P. 151–167° C., which on recrystallization from acetone-Skellysolve B melted at 194° C.

*Analysis.*—Calcd. for $C_{16}H_{29}NO_2$: C, 71.86; H, 10.93; N, 5.24. Found: C, 71.34; H, 10.54; N, 5.36.

Chromatographic analysis showed the presence of other oxygenated 4-morpholinobicyclohexyls in the mother liquors.

Example 21

*Bioconversion of 4-piperidinobicyclohexyl*

The procedures of Example 20 are repeated using the microorganism *Boletus sp.*, Peck 168, (Ohio State University) and 2.0 g. of 4-piperidinobicyclohexyl as the substrate to give a mixture of oxygenated 4-piperidinobicyclohexyls comprised mainly of 4-piperidino-4'-hydroxybicyclohexyl.

In the same manner, other heterocyclic amines of Formula I, e.g., morpholines, piperidines, pyrrolidines, thiomorpholines, piperazines, N-acyl piperazines and the like, can be substituted for the substrate of Example 20 to produce mixtures of the corresponding oxygenated amines comprised mainly of the corresponding 4'-hydroxy compounds. The following conversions showing the major products obtained and the use of other species of microorganisms are representative:

3-piperidinobicyclohexyl with *Dermea balsama*, CBS, to 3-piperidino-4'-hydroxybicyclohexyl;

2-morpholinobicyclohexyl with *Cenangium abietis*, CBS, to 2-morpholino-4'-hydroxybicyclohexyl;

3-(4-acetyl-1-piperazinyl)bicyclohexyl with *Gloniopsis brevisaccata*, CBS, to 3-(4-acetyl-1-piperazinyl)-4'-hydroxybicyclohexyl;

4-thiomorpholinobicyclohexyl with *Cylindrocarpon radicicola*, ATCC 11811, to 4-thiomorpholino-4'-hydroxybicyclohexyl.

In Examples 2–20, above, other species of microorganisms of Phylum III, Subphylum 2, for example, those species listed in Table II above can be substituted in place of the one named in each of the above examples to give the same products but differing in the relative amounts of the microbially oxygenated products obtained in each.

We claim:
1. 4-morpholino-4'-hydroxybicyclohexyl.
2. 4-piperidino-4'-hydroxybicyclohexyl.

References Cited

UNITED STATES PATENTS 2,578,641  12/1951  Cooper _____ 260—239.1

NICHOLAS S. RIZZO, *Primary Examiner.*

JOSE TOVAR, *Examiner.*